United States Patent Office 3,464,970
Patented Sept. 2, 1969

3,464,970
PROCESS FOR PREPARING OVER-BASED SULFURIZED CALCIUM PHENATES
Yoshinori Sakai and Takashi Hori, Wakayama-ken, Japan, assignors to Maruzen Oil Company, Limited, Osaka, Japan, a corporation of Japan
No Drawing. Filed Mar. 13, 1967, Ser. No. 622,432
Int. Cl. C07f 3/04; C07g 17/00; C07c 161/00
U.S. Cl. 260—137                                          7 Claims

ABSTRACT OF THE DISCLOSURE

Over-based sulfurized calcium phenate (Ca=200–600% or more times of theoretical value) which is useful as a detergent for lubricating oils as well as a stabilizer for fuel oils, such as diesel engine oils. In a process for preparing the phenate by heating a mixture of phenolic compounds, dihydric alcohol, elementary sulfur and calcium compounds, such as calcium hydroxide or oxide, removing the unreacted dihydric alcohol and formed water from the reaction product, and treating the residue with $CO_2$; higher alcohol ($C_9$–$C_{18}$) is added to the mixture to be heated and a temperature below 150° C. is used for the removing.

BACKGROUND OF THE INVENTION

Field of the invention

Recently, low-grade fuel oils have come to be widely used in diesel engines, particularly large marine diesel engines. In order to eliminate detrimental effects of acids formed by the use of such fuel oils, alkaline detergent additives, especially the so-called phenates, capable of neutralizing the acids have widely been used in lubricants employed for the lubrication of said engines. Of these phenates, those containing an alkaline earth metal in a theoretical amount based on the hydroxyl radical of phenolic compound, i.e. those containing an alkaline earth metal in a proportion of ½ atom per hydroxyl radical of phenolic compound, are generally called as normal phenates and have been used from considerably old times. As the grade of fuel oils lowers, however, there have come to be required basic phenates containing more than the theoretical amount of alkaline earth metal or over-based phenates higher in alkaline earth metal content than the basic phenates. The said phenates are also used for stabilizing fuel oils.

For the preparation of over-based phenates, there have been known two processes; one is a process in which a phenolic compound is first sulfurized with such a sulfurizing agent as sulfur monochloride to obtain a sulfide, which is then reacted with an alkaline earth metal reagent; while the other is a process in which elementary sulfur, an alkaline earth metal and a dihydric alcohol are added to a phenolic compound to carry out sulfurization reaction and metal addition reaction in parallel. It has been reported that said two processes differ also in structures and properties of products.

The present invention relates to the latter of said two processes. It is extremely difficult to react an alkaline earth metal in an amount more than the theoretical amount based on the hydroxyl radical of a phenolic compound, and there has been no such case where the metal is reacted in an amount more than 200% of the theoretical amount (1 gram equivalent of calcium reacted per hydroxyl group of the phenolic compound is regarded as the theoretical amount 100%; the same shall apply hereinafter.) The present inventors intend to provide a process in which such a large amount of calcium as 200–600% of the theoretical amount is reacted to obtain over-based phenates in high yields, inhibiting the occurrence of side reactions.

Description of the prior art

A process carried out by reacting an alkylphenol with elementary sulfur, calcium oxide or hydroxide and a dihydric alcohol, distilling off from the reaction product water formed by the reaction and unreacted dihydric alcohol and reacting the resulting residue with carbon dioxide is taught in U.S. Patents Nos. 2,680,096 and 3,036,971. In the above process, however, the calcium content of the phenate obtained is about 170% of the theoretical amount, and the yield based on the calcium oxide or hydroxide employed in the reaction is markedly low. Even when a larger amount of calcium oxide or hydroxide is used in the reaction in order to obtain a phenate having a calcium content higher than the above, the oxide or hydroxide is lost as a precipitate, and the object cannot be achieved. A method in which is reacted such a large amount of an alkaline earth metal as 450% of the theoretical amount is disclosed in U.S. Patent No. 3,178,368. The above method, however, requires the combination use of an alkylaryl sulfonate as a starting material, and the amount 450% includes also the amount of metal contained in the sulfonate. Further, the product obtained according to the above method is in the form of a mixture of a metal phenate and a metal sulfonate. U.S. Patent No. 2,680,097 describes a process similar to that of U.S. Patent No. 2,680,096. This process, however, not only differs from the present invention in time of reacting elementary sulfur, but also has not solved the subject that such a large amount of calcium as 200–600% of the theoretical amount is reacted. British Patent No. 900,059 discloses a process quite similar to those set forth in U.S. Patents Nos. 2,680,096 and 3,036,971, i.e. a process carried out by reacting an alkylphenol with elementary sulfur, an alkaline earth metal salt and a dihydric alcohol, removing only water from the reaction product, heating the water-free reaction product together with carbon dioxide in the presence of a dihydric alcohol, and then reacting the resultant further with the dihydric alcohol and alkaline earth metal salt. However, in this process also, the amount of alkaline earth metal reacted at one time is small and there are not disclosed the means for preparing phenates containing large amounts of calcium which are the object of the present invention. Further, to effect, like in the above process, the step of reacting carbon dioxide in the presence of a dihydric alcohol gives detrimental effects to yields, as will be mentioned later, and the dihydric alcohol is preferably removed prior to the carbon dioxide treatment like in the case of the aforesaid U.S. Patents Nos. 2,680,096 and 3,036,971.

Further, Japanese Patents Nos. 436,005, 436,006 and 485,355 (inventions of the present inventors) disclose the use of higher alcohols in the preparation of phenates. However, the processes set forth in said patents belong to the category of the former of the aforesaid two processes for preparing over-based phenates, and differ from the present process in reactants, reaction mechanism as well as in structures and properties of the products.

BRIEF SUMMARY OF THE INVENTION

In a process for preparing an over-based sulfurized calcium phenate by reacting a phenolic compound, a dihydric alcohol, elementary sulfur and a calcium compound to effect sulfurization and calcium addition reactions in parallel, removing formed water and unreacted dihydric alcohol from the reaction product and then subjecting the reaction product to carbon dioxide treatment, an improvement which comprises mixing at least one phenolic compound selected from the group consisting of phenols and mono- and di- alkyl phenols, a dihydric alcohol, elementary sulfur, 2–6 g. equivalents per hydroxyl radical of said phenolic compound of a calcium compound and 50–1000% by weight based on said phenolic compound of a $C_9$-$C_{18}$ higher alcohol having a higher boiling point than said dihydric alcohol, subjecting the mixture to sulfurization and calcium addition reactions at 110–150° C., removing the generated hydrogen sulfide, maintaining after completion of the sulfurization reaction the temperature at 20–150° C. to complete the calcium addition reaction, removing by reduced pressure distillation at below 150° C. water formed due to the reaction and unreacted dihydric alcohol, heating the distillation residue together with carbon dioxide and then removing the higher alcohol and a small amount of precipitate formed to obtain an over-based sulfurized calcium phenate having a calcium content of 200–600% based on the the theoretical amount.

A process according to the process mentioned above in which the distillation residue treated with carbon dioxide is repeatedly subjected to calcium addition reaction by further addition of the dihydric alcohol and the calcium compound, the reaction product is subjected to carbon dioxide treatment and then the higher alcohol and a small amount of precipitate formed are removed to obtain a phenate higher in calcium content.

DETAILED DESCRIPTION

This invention relates to a process for preparing overbased sulfurized calcium phenates high in calcium content.

The present inventors investigated a process for achieving the above object by reacting a large amount of calcium with phenolic compounds without using alkylaryl sulfonate in combination.

U.S. Patents Nos. 2,680,096 and 3,036,971 describe that the removal by distillation of water formed by the reaction and unreacted dihydric alcohol is preferably effected at a temperature of 325°–400° F. (162°–204° C.). In fact, the present inventors recognized that the product obtained by reacting a phenolic compound with elementary sulfur, dihydric alcohol and calcium oxide or hydroxide is markedly high in polarity and, in order to distill off substantially completely the water formed by the reaction and the unreacted dihydric alcohol, which is extremely high in polarity and which, in the subsequent steps, gives detrimental effects to said product, the temperature is necessarily elevated to above 160° C. even under reduced pressure, and that it is unavoidable to adopt the temperature conditions regulated in said U.S. Patents Nos. 2,680,096 and 3,036,971. The present inventors, however, recognized that the distillation at said elevated temperature makes greater the amount of precipitate formed, and found that when the above reaction was effected at a low temperature using a higher alcohol as a solvent for the reaction and the distillation was also carried out at a low temperature, a phenate containing a large amount of calcium, the production of which has been impossible heretofore, can be prepared substantially quantitatively in an improved yield, inhibiting such side reactions as precipitate formation and the like.

It has been found that in accordance with the present invention, it is possible to produce a sulfurized calcium phenate containing calcium in an amount 200–600% of the theoretical amount by mixing at least one phenolic compound, a dihydric alcohol, elementary sulfur and a calcium reagent selected from the group consisting of calcium oxide and hydroxide with 50–1000% by weight based on the phenolic compound of a higher alcohol, reacting the mixture at a temperature of 110°–150° C., removing generated hydrogen sulfide, maintaining the temperature at 20°–150° C. after completion of the sulfurization reaction, continuing the reaction until the calcium reagent has been reacted completely, distilling water formed by the reaction and unreacted dihydric alcohol at below 150° C. under reduced pressure, heating the distillation residue together with carbon dioxide, and then removing the higher alcohol and a small amount of precipitate.

The phenolic compounds employed in the present invention are compounds represented by the general formula

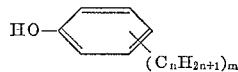

wherein $n$ is a positive integer from 0 to 30, and $m$ is 1 or 2. Concretely, these compounds include phenol, butylphenol, amylphenol, octylphenol, dioctylphenol, nonylphenol, dinonylphenol, dodecylphenol, cetylphenol and mixtures thereof.

As the calcium reagent to be reacted, there is used calcium oxide or hydroxide. The present invention may also be effected by use of an oxide or hydroxide of other alkaline earth metal than calcium. In this case, however, the yield is disadvantageously lowered for an unknown reason. The amount of calcium reagent employed in the reaction is 2–6 g. equivalents per hydroxyl group of the phenolic compound used and may be freely selected from a range of such large amounts as 4–6 g. equivalents. Of course, the calcium reagent may be used in an amount less than 2 g. equivalents. In this case, however, the calcium content of the resulting phenate becomes low and one of the objects of the present invention is lost. In accordance with the present invention, the reaction proceeds substantially quantitatively so that the calcium reagent may be used in an amount calculated from a desired calcium content, and no excess calcium reagent is required to be subjected to the reaction, unlike the conventional process.

The dihydric alcohol employed is preferably one low in boiling point and viscosity and high in reactivity. Concretely, such dihydric alcohol is one having 2–6 carbon atoms, and is most preferably ethylene glycol. The amount of dihydric alcohol employed varies depending on the amounts of calcium reagent and elementary sulfur used, but should be at least 0.5 mol per mol of the calcium reagent employed. However, the dihydric alcohol acts by itself as a solvent and hence is ordinarily used in excess.

Elementary sulfur is used in an amount of 0.5–2.5 g. atoms, preferably 1–2 g. atoms, per mole of phenolic compound.

The higher alcohol used as solvent is a straight chain or branched aliphatic saturated monohydric alcohol having 9–18, preferably 9–14, carbon atoms, and is required to be higher in boiling point than the dihydric alcohol used. This higher alcohol is effective to maintain the reaction mixture in a liquid state in the sulfurization reaction and calcium addition reaction steps as well as to smoothly progress the reaction at a low temperature. Particularly, the higher alcohol makes it possible, prior to reacting carbon dioxide with the product of sulfurization and calcium addition reactions, to distill off water formed reacting carbon dioxide with the product of sulfurization perature below 150° C., thereby preventing the formation of precipitate, as well as facilitating the practice of the carbon dioxide treatment step.

In the present invention, a lubricating oil is advantageously added as a diluent to make easier the handling of the reaction product. Such lubricating oils include synthetic lubricants and petroleum lubricants such as naphthenic base, paraffinic base and mixed base lubricating oils.

In practicing, in accordance with the present invention, the sulfurization reaction of phenolic compound by use of elementary sulfur and the calcium addition reaction to phenolic compound, the use of higher alcohol and the temperature control in said reactions are of importance. That is, the sulfurization reaction should be carried out at a temperature between 110° and 150° C. and the calcium addition reaction at a temperature between 20° and 150° C. At a temperature lower than said temperature ranges, respective reactions difficultly proceed, while at a temperature higher than said ranges, side reactions are brought about and the amount of precipitate formed becomes marked. Further, the sulfurization reaction is desirably not effected under pressure, and the generated hydrogen sulfide is required to be removed out of the reaction system as much as possible. In case the removal of hydrogen sulfide has been insufficient or the sulfurization reaction has been discontinued during the sulfurization reaction step, side reactions are caused or unreacted substances are left in the subsequent reaction steps, whereby the amount of precipitate formed increases and the calcium content of the resulting phenate becomes low. The time of completion of the sulfurization reaction varies depending on the reaction temperature, stirring effect and the amount of reagent used, but can be easily decided by effecting a simple bench scale test under conditions so selected as to employ the specific procedures of the present process. The time of completion of the sulfurization reaction may conveniently be judged by measuring the amount of hydrogen sulfide generated per unit time. That is, it has been known that a time at which the amount of generated hydrogen sulfide has become ½ the maximum generated amount may be regarded as the time of completion of the sulfurization reaction, and that when the temperature of the reaction mixture is lowered thereafter, favorable results can be obtained. Concretely, the above time is later than one hour after the initiation of the reaction. The time of completion of the calcium addition reaction may also be decided according to a simple bench scale test, and the reaction requires about 1–10 hours.

In the present invention, the sulfurization reaction and the calcium addition reaction are carried out simultaneously. That is, a phenolic compound, a dihydric alcohol, elementary sulfur and a calcium reagent are mixed with a higher alcohol, and the temperature is elevated to 110°–150° C. to initiate the reactions. However, the dihydric alcohol and calcium reagent are not required to be added in total amounts at the time of initiation of the reaction, and a part of the dihydric alcohol and/or calcium reagent may be added to the reaction system after completion of the sulfurization reaction to continue the calcium addition reaction.

Water formed in the sulfurization and calcium addition reactions and unreacted dihydric alcohol should be removed by distillation prior to reacting carbon dioxide with the reaction product. In case the removal of said substances has been insufficient, a precipitate of calcium carbonate is formed when the reaction product is contacted with carbon dioxide and, in some cases, substantially all of the calcium is converted into a precipitate.

In said distillation step also, it is necessary to maintain the distillation residue at a temperature below 150° C. In case the distillation residue is heated to a temperature above 150° C., like in the conventional method, there is formed a large amount of precipitate as formed in the sulfurization and calcium addition reactions and the calcium content of the product phenate is lowered. Since the boiling point of dihydric alcohol is above 150° C., the above distillation should necessarily be effected under reduced pressure. Further, in order to remove substantially completely the water and dihydric alcohol, a sufficient amount of higher alcohol is required to be present in the distillation residue, and therefore the step is carried out under such conditions that the higher alcohol is not distilled off. Further, in the subsequent step of reacting carbon dioxide also, the presence of higher alcohol facilitates the handling and reaction of the reactants.

When a phenate low in calcium content is to be obtained, i.e. when calcium in an amount of 100–200% of the theoretical amount is to be added, the temperature control in the sulfurization and calcium addition reaction step is not so necessary and the loss of calcium reagent is small. However, it is quite unexpected that when a large amount of calcium is desired to be added, like in the present invention, and in case the above steps are effected at temperature out of the temperature ranges regulated in the present invention, such a large amount as 40%, and in some cases 80%, of the calcium reagent subjected to the reaction is converted into a precipitate, and the calcium content of the desired phenate is lowered to make it impossible to achieve the object.

The distillation residue freed from the water and the dihydric alcohol is reacted with carbon dioxide. The object and procedures for the practice of the above step are well known. Briefly, the step is carried out in the following manner: The distillation residue dissolved in a higher alcohol is contacted with carbon dioxide at atmospheric pressure or under pressure. The contact is effected at a temperature below 150° C. in order to avoid side reactions until no absorption of carbon dioxide is observed. The residue which has absorbed carbon dioxide is stable, but is desirably maintained at 120°–200° C., which should be higher than the temperature used for absorption of carbon dioxide, for several minutes to 10 hours. Particularly when carbon dioxide has been absorbed at a low temperature, it is preferable to maintain the residue at said high temperature, whereby the resulting phenate is improved in stability to water and heat as well as in oil-solubility.

In the present invention, the product which has left the carbon dioxide reaction step is in the form of a solution in the higher alcohol, and is desirably recovered from the economical and practical standpoints. The recovery is preferably effected according to distillation. In accordance with the present invention, there are formed very small amounts of precipitates which are unreacted substances and side reaction products due to unreacted elementary sulfur and calcium reagent. These substances are removed, either before or after the recovery of the higher alcohol, by means of filtration or centrifugal operation.

In the present invention, the sulfurization and calcium addition reaction step and subsequent distillation step are preferably effected not in the presence of an acidic gas such as hydrogen sulfide or carbon dioxide but in the presence of an inert gas such as nitrogen.

Further, the distillation step effected for the recovery of the higher alcohol after said carbon dioxide treatment is preferably effected in the same manner as above. In this case, however, the presence of carbon dioxide is not objectionable.

In accordance with the present invention, as much as 200–600% of the theoretical amount of calcium can be reacted substantially quantitatively and, moreover, the resulting calcium phenates have been improved in storage stability and engine detergency as compared with those obtained according to the conventional methods. Further, even when p-octylphenol, which is low in oil-solubility among alkylphenols, is used in accordance with the present invention, the resulting phenate is readily soluble in a highly purified heavy paraffinic lubricating oil which is markedly low in dissolving power. Furthermore, sulfurized calcium phenate is generally used not only for an alkaline detergent additive of lubricating oil, but also for a stabilizer of fuel oil. The present phenate can be used more effectively also for the stabilizer of fuel oil compared with conventional phenates.

The calcium phenates obtained according to the above-mentioned process of the present invention are those having a calcium content of 200–600% of the theoretical amount. In case calcium phenates greater in calcium content than the above are desired to be obtained, the calcium phenates prepared in accordance with the present invention may be used in place of the phenolic compounds of the present invention and may be subjected to the same procedures as in the present invention, though the resulting clacium phenates have been lowered in oil-solubility.

EXAMPLES OF THE INVENTION

The present invention will be fully illustrated in detail below with reference to examples. In each of the following examples and comparative examples, the amount of precipitate is represented, in order to grasp the accurate amount thereof, by the amount obtained by diluting the product phenate with 2–6 times the volume of phenate of n-hexane, separating the resulting precipitate by centrifuge and further washing and drying the precipitate several times with n-hexane.

Example 1

A mixture of 41.2 g. (0.2 mol) of p-octylphenol, 28.1 g. (0.5 mol) of calcium oxide, 9.6 g. (0.3 g. atom) of elementary sulfur, 100.0 g. of lauryl alcohol and 124.0 g. of ethylene glycol was reacted with stirring at 138° C. In about 6 hours from the initiation of the reaction, the generation of hydrogen sulfide came to be scarcely observed. During the reaction, 0.6 g. in total of hydrogen sulfide had been removed to obtain 299.3 g. of yellowish green turbid viscous solution. 296.7 g. of this solution was charged in a distillation means, was mixed with 200.0 g. of lauryl alcohol and was distilled under reduced pressure in a nitrogen atmosphere to remove from the solution a small amount of water, unreacted ethylene glycol and a small amount of lauryl alcohol to obtain 330.6 g. of a distillation residue. In the above distillation, the maximum temperature of the bottom residue was 133° C. and the final distillation temperature was 120° C. under 10 mm. Hg.

329.4 g. of the above distillation residue was transferred into an autoclave, and carbon dioxide was introduced under a pressure of 2–10 kg./cm.$^2$ (gauge pressure) and was absorbed at 100° C. until no absorption of carbon dioxide had been observed. Thereafter, the residue was maintained at 160° C. for 30 minutes to obtain 347.0 g. of a brown liquid product. 344.3 g. of the liquid product was transferred into a distillation means and was mixed with 100.0 g. of 150-Neutral Oil (a highly solvent refined light paraffinic lubricating oil having a viscosity of 5.31 cs. at 210° F. and a viscosity index of 100). From the mixture, lauryl alcohol and a part of oil were removed in a nitrogen atmosphere by distillation under reduced pressure to obtain 146.8 g. of a brown viscous liquid residue. From this residue, 1.1 g. of n-hexane insolubles were removed, whereby a dark brown viscous liquid product was obtained. The analysis values of the thus obtained product were as follows:

| | |
|---|---|
| Viscosity, 210° F. (cs.) | 687.9 |
| Total base number (JIS K–2502 [1]) | 322 |
| Calcium content (wt. percent) | 11.52 |
| Sulfur content (wt. percent) | 3.74 |
| Carbon dioxide content (wt. percent) | 9.42 |

[1] Japanese Industrial Standards K–2502 "Testing Method for Neutralization Value of Petroleum Product."

The amount of calcium reacted was about 500% of the theoretical amount based on the starting phenolic compound.

Example 2

A mixture comprising 105.0 g. (0.43 mol) of an alkyl phenol mixture (according to gas-chromatography mass spectrography and other analytical methods, it was evident that said mixture was composed of more than 16 alkyl phenols and had an average molecular weight of 245 and a boiling point within the range of 229° to 330° C., in which those having $C_4$ alkyl radicals were 6 mol percent, those having $C_8$ alkyl radicals were 18 mol percent and those having $C_{12}$ alkyl radicals were 76 mol percent; and of the alkyl phenols having $C_8$ alkyl radicals, about 36 mol percent was mono-octyl phenol and about 64% was di-octyl phenol), 58.4 g. (1.0 mol) of calcium oxide, 16.7 g. (0.52 g. atom) of elementary sulfur, 400.0 g. of a tridecanol mixture and 155.4 g. of ethylene glycol was reacted with stirring at about 136° C. for about 5 hours. During the reaction, 1.1 g. of hydrogen sulfide was removed, and 729.1 g. of a grayish green liquid product was obtained.

714.9 g. of the thus obtained liquid was transferred to a distillation means to remove a small amount of water, unreacted ethylene glycol and a small amount of tridecanol, whereby 540.5 g. of a distillation residue was obtained. In the above distillation, the maximum temperature of the bottom residue was 135° C. and the final distillation temperature was 122° C. under 6 mm. Hg.

523.0 g. of said distillation residue was transferred to an autoclave, and carbon dioxide was introduced under pressure into the autoclave 10 kg./cm.$^2$ (gauge pressure) and was absorbed until no absorption of carbon dioxide had been observed. Thereafter, the reaction mixture was maintained at 166° C. for one hour to obtain 558.1 g. of a brown liquid product.

554.0 g. of this product was transferred to a distillation means and was mixed with 140.0 g. of 100 Neutral Oil (a highly solvent-refined paraffinic light lubricating oil having a viscosity at 210° F. of 4.17 cs. and a viscosity index of 97.0). From the mixture, tridecanol and a small amount of oil were removed under reduced pressure to obtain 318.2 g. of a brown viscous liquid product.

From this product, 2.0 g. of n-hexane insolubles were removed, whereby 316.0 g. of a brown transparent liquid product was obtained. The analysis values of the thus obtained product were as shown below:

| | |
|---|---|
| Viscosity, 21° F. (cs.) | 240.1 |
| Total base number (JIS K–2502) | 300 |
| Calcium content (wt. percent) | 10.73 |
| Sulfur content (wt. percent) | 4.44 |
| Carbon dioxide content (wt. percent) | 7.52 |

The amount of calcium reacted was about 500% of the theoretical amount based on the starting phenolic compound.

Example 3

28.1 g. (0.5 mol) of calcium oxide, 31.0 g. of ethylene glycol and 100.0 g. of lauryl alcohol were mixed, and the resulting suspension was elevated in temperature to 70° C. To this suspension were added 9.6 g. (0.3 g. atom) of elementary sulfur and 41.2 g. (0.2 mol) of p-octylphenol, and the mixture was reacted with stirring at 137° C. During the reaction, the amount of hydrogen sulfide generated per 10 minutes was measured. At the time when said amount had become less than ½ the maximum generated amount, the reaction was regarded to have been complete, and the temperature was lowered. The reaction required about 3 hours, and 1.2 g. of hydrogen sulfide had been removed during the reaction. The resulting solution was then incorporated with 43.4 g. of ethylene glycol, and the mixture was reacted at 86° C. to obtain 248.1 g. of a dark yellowish green viscous solution.

247.0 g. of this solution was transferred into a distillation means, was mixed with 70.0 g. of lauryl alcohol and was distilled under reduced pressure in a nitrogen atmosphere to remove from the solution a small amount of water, unreacted ethylene glycol and a small amount of lauryl alcohol to obtain 229.5 g. of a distillation residue. In the above distillation the maximum temperature of the bottom residue was controlled below 136° C. and the final distillation temperature was 126° C. under 9 mm. Hg.

227.2 g. of the above distillation residue was transferred into an autoclave and was reacted with carbon dioxide at 95° C. under a pressure of 2–10 kg./cm.$^2$ (gauge pressure). At the time when no absorption of carbon dioxide had been observed any more, the temperature was elevated to about 180° C. and the residue was maintained at said temperature for 4 hours to obtain 245.3 g. of a dark reddish brown translucent liquid product.

235.6 g. of this product was transferred into a distillation means and was mixed with 100.0 g. of 150-Neutral Oil employed in Example 1. From the mixture, lauryl alcohol and a small amount of oil were removed in a nitrogen atmosphere by distillation under reduced pressure to obtain 182.7 g. of a dark brown transparent liquid residue. From this residue, 0.8 g. of n-hexane insolubles were removed, whereby 181.8 g. of a dark brown transparent liquid product was obtained. The analysis values of the product were as follows:

| | |
|---|---|
| Viscosity 210° F. (cs.) | 90.68 |
| Total base number (JIS K–2502) | 262 |
| Calcium content (wt. percent) | 9.39 |
| Sulfur content (wt. percent) | 3.09 |
| Carbon dioxide content (wt. percent) | 8.28 |

The amount of calcium reacted was about 500% of the theoretical amount based on the starting phenolic compound.

Example 4

A mixture of 41.2 g. (0.2 mol) of p-octylphenol, 7.4 g. (0.1 mol) of calcium hydroxide, 9.6 g. (0.3 g. atom) of elementary sulfur, 31.0 g. of ethylene glycol and 100.0 g. of lauryl alcohol was reacted with stirring at 138° C. in a nitrogen atmosphere. After about 5 hours from the initiation of the reaction, the generation of hydrogen sulfide came to be scarcely observed, and therefore the temperature was lowered. During the reaction, 2.3 g. of hydrogen sulfide had been removed. The resulting solution was incorpated with 100.0 g. of ethylene glycol and 29.6 g. (0.4 mol) of calcium hydroxide, and the mixture was reacted with stirring to obtain 260.1 g. of a brownish khaki solution.

259.1 g. of this solution was transferred into a distillation means and was mixed with 135.0 g. of lauryl alcohol and 50.0 g. of 150-Neutral Oil employed in Example 1. From the mixture, a small amount of water, unreacted ethylene glycol and a small amount of lauryl alcohol were removed in a nitrogen atmosphere by distillation under reduced pressure to obtain 275.3 g. of a liquid distillation residue. In the above distillation, the maximum temperature of the bottom residue was controlled below 140° C. and the final distillation temperature was 125° C. under 4 mm. Hg.

273.4 g. of the above distillation residue was transferred into an autoclave, and carbon dioxide was absorbed at about 102° C. under a pressure of 2–10 kg./cm.$^2$ (gauge pressure). Thereafter, the residue was maintained at 163° C. under said pressure for about one hour to obtain 293.2 g. of a brownish khaki liquid product.

289.5 g. of this product was transferred into a distillation means and was mixed with 50.0 g. of 150-Neutral Oil. From the mixture, lauryl alcohol and a small amount of oil were removed in a nitrogen atmosphere by distillation under reduced pressure and, further, minute amounts of n-hexane insolubles were removed, whereby 182.0 g. of a brownish transparent viscous liquid product was obtained. The analysis values of this final product were as follows:

| | |
|---|---|
| Viscosity 210° F. (cs.) | 142.2 |
| Total base number (JIS K–2502) | 243 |
| Calcium content (wt. percent) | 8.85 |
| Sulfur content (wt. percent) | 2.85 |
| Carbon dioxide content (wt. percent) | 6.26 |

The amount of calcium reacted was about 500% of the theoretical amount based on the starting phenolic compound.

Example 5

A mixture comprising 41.2 g. (0.2 mol) of p-octylphenol, 9.5 g. (0.1 mol) of phenol, 16.9 g. (0.3 mol) of calcium oxide, 11.3 g. (0.35 g. atom) of elementary sulfur, 200.0 g. of lauryl alcohol and 93.3 g. (1.5 mols) of ethylene glycol was reacted with stirring at about 138° C. for 4 hours. During the reaction, 1.5 g. of hydrogen sulfide was removed and a greenish brown liquid product was obtained. To this product, 16.9 g. (0.3 mol) of calcium oxide was added, and the mixture was stirred at 98° C. for 2 hours to obtain 385.6 of a dark brown liquid product.

383.8 g. of this product was transferred to a distillation means and was mixed with 100.0 g. of the 100-Neutral Oil employed in Example 2. From the mixture, a small amount of water, unreacted ethylene glycol and a small amount of lauryl alcohol were removed under reduced pressure in a nitrogen atmosphere to obtain 376.7 g. of a brownish khaki liquid distillation residue. In the above distillation, the maximum temperature of the bottom residue was controlled below 137° C. and the final distillation temperature was 125° C. under 10 mm. Hg.

373.0 g. of the above distillation residue was charged in an autoclave, and carbon dioxide was introduced under pressure into the autoclave to 10 kg./cm.$^2$ (gauge pressure) and was absorbed until no absorption of carbon dioxide had been observed at about 105° C. Thereafter, the autoclave was maintained at 163° C. for one hour to obtain 395.9 g. of a brown liquid product.

392.7 g. of this product was transferred to a distillation means, and lauryl alcohol and a small amount of oil were removed under reduced pressure to obtain 166.9 g. of a brown viscous distillation residue. This distillation residue was mixed with 267.0 g. of 100-Neutral Oil, and 1.2 g. of n-hexane insolubles were removed from the mixture, whereby 432.5 g. of a brown transparent liquid product was obtained. The analysis values of the thus obtained product were as follows:

| | |
|---|---|
| Viscosity, 210° F. (cs.) | 17.86 |
| Total base number (JIS K–2502) | 136 |
| Calicum content (wt. percent) | 4.86 |
| Sulfur content (wt. percent) | 2.01 |
| Carbon dioxide content (wt. percent) | 3.66 |

The amount of calcium reacted was about 400% of the theoretical amount based on the starting phenolic compound.

Example 6

A mixture of 41.2 g. (0.2 mol) of p-octylphenol, 5.7 g. (0.1 mol) of calcium oxide, 9.6 g. (0.3 g. atom) of elementary sulfur, 31.0 g. of ethylene glycol and 100.0 g. of lauryl alcohol was reacted with stirring at 133° C. During the reaction, the amount of hydrogen sulfide generated per 10 minutes was measured, and when the generated amount had become less than ½ the maximum generated amount, the temperature was lowered. The reaction required about 3 hours, and 2.1 g. of hydrogen sulfide had been removed during the reaction. Thereafter, the resulting solution was incorporated with 5.7 g. (0.1 mol) of calcium oxide, and the mixture was reacted at 86° C. to obtain 188.2 g. of a dark brown transparent solution.

187.7 g. of this solution was transferred into a distillation means and was mixed with 50.0 g. of lauryl alcohol. From the mixture, a small amount of water, unreacted ethylene glycol and a small amount of lauryl alcohol were removed in a nitrogen atmosphere by distillation under reduced pressure to obtain 192.0 g. of a dark brown transparent viscous liquid distillation residue. During the above distillation, the maximum temperature of the bottom residue was controlled below 135° C. and the final distillation temperature was 125° C. under 7 mm. Hg.

191.1 g. of the above distillation residue was transferred into an autoclave and was reacted with carbon dioxide at about 80° C. under a pressure of 2–10 kg./cm.$^2$ (gauge pressure) until no absorption of carbon dioxide had been observed. Thereafter, the residue was maintained at about 160° C. for 3 hours to obtain 200.4 g. of a dark reddish light brown transparent liquid product.

198.9 g. of this product was charged into a reactor and was mixed with 31.0 g. of ethylene glycol and 11.4 g. (0.2 mol) of calcium oxide. The mixture was reacted with stirring at 84° C. to obtain 240.0 g. of a chocolate-colored translucent solution. From 239.6 g. of this solution, a small amount of water, unreacted ethylene glycol and a small amount of lauryl alcohol were removed in a nitrogen atmosphere by distillation under reduced pressure to obtain 194.8 g. of a dark brown translucent viscous liquid residue. During the above distillation, the bottom residue was maintained at 134° C. at the maximum and the final distillation temperature was 129° C. under 6 mm. Hg.

193.2 g. of the above distillation residue was reacted with carbon dioxide at 80° C. under a pressure of 2–10 kg./cm.$^2$ (gauge pressure) until no absorption of carbon dioxide had been observed. Thereafter, the residue was maintained at about 160° C. for 3 hours to obtain 201.0 g. of a dark brown transparent liquid product.

199.0 g. of this product was reacted with 5.7 g. (0.1 mol) of calcium oxide under substantially the same conditions as above to form 228.9 g. of a carbon dioxide-treated product.

227.5 g. of this product was further reacted with 11.2 g. (0.2 mol) of calcium oxide under the same conditions as above to obtain 233.7 g. of a brown transparent viscous liquid carbon dioxide-treated product.

228.6 g. of this product was mixed with 110.0 g. of 150-Neutral Oil. From the mixture, lauryl alcohol and a small amount of oil were removed in a nitrogen atmosphere by distillation under reduced pressure to obtain 212.1 g. of a brown viscous liquid distillation residue. From this residue, 1.7 g. of n-hexane insolubles were removed, whereby 210.1 g. of a brown transparent viscous product was obtained. The analysis values of the final product were as follows:

Viscosity 210° F. (cs.) _____ 446.8
Total base number (JIS K–2502) _____ 326
Calcium content (wt. percent) _____ 11.5
Sulfur content (wt. percent) _____ 2.44
Carbon dioxide content (wt. percent) _____ 10.1

The amount of calcium reacted was about 700% of the theoretical amount based on the starting phenolic compound.

Comparative Example 1

41.2 g. (0.2 mol) of p-octylphenol, 28.1 g. (0.5 mol) of calcium oxide, 9.6 g. (0.3 g. atom) of elementary sulfur, 150.0 g. of 150-Neutral Oil and 31.0 g. of ethylene glycol were mixed and the mixture was reacted with stirring at 138° C. In about 6 hours after initiation of the reaction, the generation of hydrogen sulfide was scarcely observed. During the reaction, 0.3 g. in total of hydrogen sulfide had been removed to obtain a mixed product of a light brown slurry and a brownish orange gel. The mixture was further incorporated with 43.4 g. of ethylene glycol and was stirred at 90° C. for 4 hours to obtain 294.7 g. of a dark greenish khaki slurry.

293.3 g. of this slurry was transferred into a distillation means, and a small amount of water, unreacted ethylene glycol and a small amount of oil were removed into a nitrogen atmosphere by distillation under reduced pressure to obtain 228.5 g. of a distillation residue. In the above distillation, the temperature of the bottom residue was elevated to 206° C.

223.5 g. of the above distillation residue was transferred into an autoclave, and carbon dioxide was absorbed at 70–100° C. under a pressure of 2–10 kg./cm.$^2$ (gauge pressure). When the absorption of carbon dioxide had not been observed any more, the temperature was elevated to and maintained at 190° C. for about 5 hours to obtain 239.5 g. of a slurry product.

225.1 g. of this product was transferred into a distillation means, and a trace amount of ethylene glycol and a small amount of oil were removed in a nitrogen atmosphere by distillation under reduced pressure to form 206.9 g. of a light yellowish green suspension. From this suspension, 65.1 g. of n-hexane insolubles were removed, whereby 141.5 g. of a brown liquid product was obtained. The analysis values of the final product and the n-hexene insolubles were as follows:

Liquid product:
  Viscosity 210° F. (cs.) _____ 6.20
  Total base number (JIS K–2502) _____ 7.8
  Calcium content (wt. percent) _____ 0.36
  Sulfur content (wt. percent) _____ 1.58
  Carbon dioxide content (wt. percent) _____ 0.29 n-Hexane insolubles, wt. percent:
  Calcium content _____ 24.08
  Sulfur content _____ 5.37
  Carbon dioxide content _____ 21.96

Comparative Example 2

44.1 g. (0.2 mol) of nonylphenol, 28.1 g. (0.5 mol) of calcium oxide, 9.6 g. (0.3 g. atom) of elementary sulfur, 50.0 g. of lauryl alcohol and 744.4 g. of ethylene glycol were mixed, and the mixture was reacted with stirring at 106° C. for about 3 hours. Thereafter, generated hydrogen sulfide was removed to obtain 202.8 g. of a dark khaki opaque solution.

201.3 g. of this solution was charged into a distillation means and was mixed with 150.0 g. of lauryl alcohol. From the mixture, a small amount of water, unreacted ethylene glycol and a small amount of lauryl alcohol were removed in a nitrogen atmosphere by distillation under reduced pressure to obtain 266.3 g. of a yellowish green liquid residue. During the distillation, the temperature of the bottom residue was controlled below 129° C.

261.9 g. of this residue was charged into an autoclave, and carbon dioxide was absorbed at about 93° C. under a pressure of 2–10 kg./cm.$^2$ (gauge pressure). When the absorption of carbon dioxide had not been observed any more, the temperature was elevated to and maintained at 180° C. for about 4 hours to obtain 270.9 g. of a yellowish brown liquid product containing a large amount of a dark brown precipitate.

From this product, 53.8 g. of n-hexane insolubles were removed, whereby 214.8 g. of a brown transparent liquid product was obtained. The analysis values of the final product were as follows:

Liquid product:
  Viscosity 210° F. (cs.) _____ 3.03
  Total base number (JIS K–2502) _____ 2.1
  Calcium content (wt. percent) _____ 0.21
  Sulfur content (wt. percent) _____ 2.81
  Carbon dioxide content (wt percent) _____ 0.01 n-Hexane insolubles, wt percent:
  Calcium content _____ 33.07
  Sulfur content _____ 0.93
  Carbon dioxide content _____ 33.54

Comparative Example 3

41.2 g. (0.2 mol) of p-octylphenol, 9.6 g. (0.3 mol) of elementary sulfur, 100.0 g. of ethylene glycol, 11.2 g. (0.2 mol) of calcium oxide and 80.0 g. of lauryl alcohol were reacted with stirring at 145°–150° C. for 5 hours under a reduced pressure of 300 mm. Hg, and the generated hydrogen sulfide was removed to obtain 238.4 g. of a brown solution.

237.8 g. of this solution was transferred into a distilation means and was mixed with 80.0 g. of 150-Neutral Oil. From the mixture, a small amount of water, unreacted ethylene glycol and a small amount of lauryl alcohol were removed in a nitrogen atmosphere by distillation under reduced pressure to obtain 192.7 g. of a brownish khaki translucent liquid distilation residue. During the distilation, the bottom residue was exposed to a temperature of 135°–161° C.

191.3 g. of the above distillation residue was transferred into an autoclave and was reacted with carbon dioxide at 85° C. under a pressure of 2–10 kg./cm.$^2$ (gauge pressure). After no absorption of carbon dioxide had been observed, the temperature was elevated to and maintained at 160° C. for about 4 hours to obtain 200.1 g. of a dark brown translucent liquid product.

198.9 g. of this product was charged in a distillation means, and the lauryl alcohol was removed from the product in a nitrogen atmosphere by distillation under reduced pressure to obtain 123.6 g. of a black brown liquid distillation residue. From this distillation residue, 6.2 g. of n-hexene insolubles were removed, whereby 117.3 g. of a dark brown transparent liquid product was obtained. The results of analysis of the final product and insolubles were as follows:

Liquid product:
    Viscosity 210° F. (cs.) _____ 32.63
    Total base number (JIS K-2502) _____ 109
    Calcium content (wt. percent) _____ 5.1
    Sulfur content (wt percent.) _____ 3.4
    Carbon dioxide content (wt. percent) _____ 4.1
n-Hexane insolubles:
    Calcium content (wt. percent) _____ 17.9
    Sulfur content (25%) _____ 0.22
    Carbon dioxide content (wt. percent) _____ 13.4

Comparative Example 4

Substantially the same operations as in Comparative Example 3 were effected, except that calcium oxide and lauryl alcohol were used in amounts of 22.4 g. (0.4 mol) and 150.0 g., respectively, whereby 33.7 g. of n-hexane insolubles were formed and 107.5 g. of a dark brown liquid product was obtained. The results of analysis of the final product and the n-hexane insolubles were as follows:

Liquid product:
    Viscosity, 210° F. (cs.) _____ 53.97
    Total base number (JIS K-2502) _____ 145
    Calcium content (wt. percent) _____ 6.7
    Sulfur content (wt. percent) _____ 2.6
    Carbon dioxide content (wt. percent) _____ 5.9
n-Hexane insolubles, wt. percent:
    Calcium content _____ 17.4
    Sulfur content _____ 0.1
    Carbon dioxide content _____ 10.3

Comparative Example 5.—Moisture absorption stability test

Compounded oils (alkalinity value: 80, diluent: a heavy paraffinic lubricating oil) incorporated, respectively, with the additive obtained according to the process of the present invention and commercial phenate type additives were allowed to stand in Tabai-Humidor (Model H-1H) maintained at a temperature of 35°±1° C. and a humidity of 95–100%, and were observed every 24 hours. The results were as shown in Table 1.

The commercial additives used for comparison were those widely employed in this field; the additive A was a normal phenate containing about 100% of the theoretical amount of calcium based on the hydroxyl group of phenolic compound, and the additive B was a basic phenate containing about 200% of the theoretical amount of calcium. The additive obtained according to the present process contained about 270% of the theoretical amount of calcium.

TABLE 1.—MOISTURE ABSORPTION STABILITY TEST RESULTS

| Compounded oil | Staying time in humidor | | |
|---|---|---|---|
| | 24 hr. | 48 hr. | 72 hr. |
| Compounded oil with the additive of the present process. | No change and clear. | No change and clear. | No change and clear. |
| Compounded oil with the commercial additive A. | ____do____ | A small amount of yellow gel-like precipitate. | A large amount of yellow gel-like precipitate. |
| Compounded oil with the commercial additive B. | ____do____ | A gel-like film on the whole surface of oil. | A gel-like film and a large amount of a yellow gel-like precipitate. |

Comparative Example 6

Compounded oils (solvent purified naphthenic lubricating oil was used as base oil) incorporated, respectively, with the additive obtained according to the present process and the commercial additive B which were the same as used in Comparative Example 5 were subjected to engine detergency test.

The properties of the compounded oils were as follows:

| | Compounded oil with the present product | Compounded oil with commercial additive B |
|---|---|---|
| Viscosity, 210° F. (cs.) | 17.52 | 17.97 |
| Alkalinity value | 78.4 | 79.02 |
| Ca (wt. percent) | 2.81 | 2.84 |

The test and evaluation were effected according to IP Std. Method 124/55 "Engine Testing of Lubricants—Ring Sticking, Deposit Forming, and Wear Characteristics").

As the result, the evaluation of the compounded oil with the present product was 16.8 and that of the compounded oil with the commercial additive B was 19.7 (in the case of clean, the evaluation is 0).

Test equipment and test conditions were as follows:

Equipment: Water-cooled, 2 cycle Kubota VC-2 type diesel engine with single cylinder.

Engine performance:
    (1) Displacement (ml.) _____ 770.
    (2) Cylinder (bare x stroke)
        (mm.) _____ 95 x 110.
    (3) Maximum power
        (p.s./r.p.m.) _____ 13/1,700.
    (4) Combustion chamber type ____ Direct injection.

Operation conditions:
    (1) Speed (r.p.m.) _____ 1,000.
    (2) Load (p.s.) _____ 3.
    (3) Time (hrs.) _____ 48.
    (4) Oil addition rate (ml./hr.) 30.
    (5) Jacket temperature (° C.) 100.
    (6) Fuel _____ Gas-oil (sulfur content 3 wt. percent).

In each of the above examples in acordance with the present invention, a calcium reagent was reacted in an amount 400–700% of the theoretical amount based on the hydroxyl radical of the phenolic compound employed, but the amount of formed n-hexane insolubles was very small and it is obvious that the reaction proceeds substantially quantitatively. In contrast thereto, in Comparative Example 1, in which the reaction was effected in the absence of higher alcohol, the sulfurization and metal addition reactions did not proceeds smoothly and a slurry was formed. Consequently, the temperature should necessarily be elevated to 206° C. in order to remove unreacted ethylene glycol substantially completely, whereby large quantities of n-hexane insolubles were formed and the alkali value of the product was greatly lowered. In Comparative Example 2, the sulfurization reaction was effected at such a low temperature as 106° C. In this comparative example also, the amount of n-hexane insolubles was large and the alkalinity value of the product was low. Compaartive Example 3 shows the case wherein the removal by distillation of water and unreacted ethylene glycol from the sulfurization and metal-addition reaction product, the temperature was elevated to 161° C. In this comparative example, the amount of metal to be added was small, like in the conventional process, and therefore the amount of formed n-hexane insolubles was relatively small. Comparative Example 4 shows the case where the reactions were effected under similar conditions to that in Comparative Example 3. In this example, however, the amount of metal to be added was great and therefore an extremely large amount of n-hexane insolubles was formed.

Comparative Example 5 shows the test results of comparison in moisture absorption stability between the sulfurized calcium phenate in accordance with the present invention and conventional phenates. As is clear from the results, the phenate according to the present invention is more stable than the conventional phenates.

Comparative Example 6 shows the test results of engine deterging ability of the present phenate compared with the conventional phenate. As clearly seen from those results, the present phenate has a superior engine deterging ability compared with the conventional phenate.

In view of the above examples, the advantageousness of the present invention would be readily understood.

We claim:

1. In a process for preparing an over-based calcium phenate by reacting a phenolic compound, a dihydric alcohol, elementary sulfur and a calcium compound to effect sulfurization and calcium addition reactions in parallel, removing formed water and unreacted dihydric alcohol from the reaction product and then subjecting the reaction product to carbon dioxide treatment, an improvement which comprises mixing at least one phenolic compound having the general formula

wherein $n$ is 0 to 30; $m$ is 1 to 2, at least 0.5 mol per mol of said phenolic compound of a dihydric alcohol having 2–6 carbon atoms, 0.5–2.5 g. atoms per mol of said phenolic compound of elementary sulfur, and 2–6 g. equivalents per hydroxyl radical of said phenolic compound of a calcium reagent selected from the group consisting of calcium oxide and calcium hydroxide with 50–1000% by weight based on said phenolic compound of a higher alcohol having 9–18 carbon atoms, said higher alcohol being higher in boiling point than said dihydric alcohol, simultaneously carying out at 110°–150° C. the sulfurization and calcium addition reactions of the mixture, removing the generated hydrogen sulfide, maintaining the temperature at 20°–150° C. after completion of the sulfurization reaction to complete the calcium addition reaction, subjecting the reaction mixture to reduced pressure distillation at below 150° C. to remove substantially completely the water formed by the reactions and unreacted dihydric alcohol, heating the distillation residue together with carbon dioxide and then removing from the carbon dioxide-treated residue the higher alcohol and a small amount of precipitate.

2. A process according to claim 1, wherein the sulfurization and calcium adition reactions and the subsequent distillation for the removal of water and dihydric alcohol are effected in the presence of an inert gas.

3. A process according to claim 1, wherein the treatment of the reaction product is effected in the presence of a lubricant as a diluent.

4. A process according to claim 1, wherein the calcium reagent to be reacted is added in part at the itme of initiation of the sulfurization and calcium addition reactions and the remaining calcium reagent is reacted after completion of the sulfurization reaction.

5. A process according to claim 1, wherein the dihydric alcohol to be reacted is added in part at the time of initiation of the sulfurization and calcium addition reactions and the remaining dihydric alcohol is reacted after completion of the sulfurization reaction.

6. A process according to claim 1, wherein the calcium reagent and dihydric alcohol to be reacted are added in part at the time of initiation of the sulfurization and calcium addition reactions and the remaining calcium reagent and dihydric alcohol are reacted after completion of the sulfurization reaction.

7. In a process for preparing an over-based calcium phenate by reacting a phenolic compound, a dihydric alcohol, elementary sulfur and a calcium compound to effect sulfurization and calcium addition reactions in parallel, removing formed water and unreacted dihydric alcohol from the reaction product and then subjecting the reaction product to carbon dioxide treatment, an improvement which comprises mixing at least one phenolic compound having the general formula

wherein $n$ is 0 to 30; and $m$ is 1 or 2, at least 0.5 mol per mol of said phenolic compound of a dihydric alcohol having 2–6 carbon atoms, 0.5–2.5 g. atoms per mol of said phenolic compound of elementary sulfur and 2–6 g. equivalents per hydroxyl radical of said phenolic compound of a calcium reagent selected from the group consisting of calcium oxide and calcium hydroxide with 50–1000% by weight based on said phenolic compound of a higher alcohol having 9–18 carbon atoms, said higher alcohol being higher in boiling point than said dihydric alcohol, simultaneously carrying out at 110°–150° C. the sulfurization and calcium addition reactions of the mixture, removing the generated hydrogen sulfide, maintaining the temperature at 20–150° C. after completion of the sulfurization reaction to complete the calcium addition reaction, subjecting the reaction mixture to reduced pressure distillation at below 150° C. to remove substantially completely the water formed by the reactions and unreacted dihydric alcohol, heating the distillation residue together with carbon dioxide, adding to the carbon dioxide-treated residue said dihydric alcohol and 2–6 g. equivalents per hydroxyl radical of said phenolic compound of a calcium reagent selected from the group consisting of calcium oxide and calcium hydroxide to effect calcium addition reaction, substantially completely removing by distillation at below 150° C. under reduced pressure the water formed by the reaction and unreacted dihydric alcohol, heating the distillation residue together with carbon dioxide and then removing from the carbon dioxide-treated residue the higher alcohol and a small amount of precipitate.

References Cited
UNITED STATES PATENTS

| | | | |
|---|---|---|---|
| 2,680,096 | 6/1954 | Walker et al. | 260—137 XR |
| 2,870,134 | 1/1959 | Kluge et al. | 260—137 |
| 3,036,971 | 5/1962 | Otto | 260—137 |

CHARLES B. PARKER, Primary Examiner

D. R. PHILLIPS, Assistant Examiner

U.S. Cl. X.R.

260—609; 252—46.4